(12) United States Patent
Yamamoto et al.

(10) Patent No.: US 10,415,583 B2
(45) Date of Patent: *Sep. 17, 2019

(54) FAN ATTACHMENT STRUCTURE

(71) Applicant: JAPAN CLIMATE SYSTEMS CORPORATION, Hiroshima (JP)

(72) Inventors: Takehiro Yamamoto, Hiroshima (JP); Kazumi Fujimoto, Hiroshima (JP); Yosuke Harada, Hiroshima (JP)

(73) Assignee: JAPAN CLIMATE SYSTEMS CORPORATION, Hiroshima (JP)

( * ) Notice: Subject to any disclaimer, the term of this patent is extended or adjusted under 35 U.S.C. 154(b) by 356 days.

This patent is subject to a terminal disclaimer.

(21) Appl. No.: 15/394,093

(22) Filed: Dec. 29, 2016

(65) Prior Publication Data

US 2017/0107997 A1   Apr. 20, 2017

Related U.S. Application Data

(63) Continuation of application No. PCT/JP2015/002982, filed on Jun. 15, 2015.

(30) Foreign Application Priority Data

Jul. 3, 2014   (JP) .................. 2014-137426

(51) Int. Cl.
   F04D 29/26   (2006.01)
   F04D 29/28   (2006.01)
   (Continued)

(52) U.S. Cl.
   CPC ............ F04D 29/263 (2013.01); B60H 1/00 (2013.01); B60H 1/00471 (2013.01);
   (Continued)

(58) Field of Classification Search
   CPC ...... F04D 29/263; F04D 25/08; F04D 29/023; F04D 29/282; F04D 29/283;
   (Continued)

(56) References Cited

U.S. PATENT DOCUMENTS 2,882,077 A * 4/1959 Marsh ................... B29C 65/565
                                                    403/383
2,974,502 A * 3/1961 Radcliffe ............... F04D 29/263
                                                    403/268
(Continued)

FOREIGN PATENT DOCUMENTS

DE       2720408 A1   10/1978
JP       62-37626 U    3/1987
(Continued)

OTHER PUBLICATIONS

Machine Translation of JP 2005054722 [retrieved on Feb. 13, 2019]. Retrieved from: Espacenet.*
(Continued)

*Primary Examiner* — Jason D Shanske
*Assistant Examiner* — Eric J Zamora Alvarez
(74) *Attorney, Agent, or Firm* — Renner, Otto, Boisselle & Sklar, LLP

(57) ABSTRACT

A fan includes a cylindrical anti-slip member that is rotatable integrally with a fan body. The anti-slip member is a molded product of a resin material with higher mechanical strength than the resin material of the fan body. A round bar output shaft is fitted into the anti-slip member. Recesses are formed on the outer peripheral surface of the anti-slip member.

3 Claims, 10 Drawing Sheets

(51) Int. Cl.
  *F04D 25/08* (2006.01)
  *B60H 1/00* (2006.01)
  *F04D 29/62* (2006.01)
  *F04D 29/02* (2006.01)

(52) U.S. Cl.
  CPC .......... *F04D 25/08* (2013.01); *F04D 29/023* (2013.01); *F04D 29/282* (2013.01); *F04D 29/283* (2013.01); *F04D 29/626* (2013.01); *F05D 2260/36* (2013.01); *F05D 2300/43* (2013.01); *F05D 2300/44* (2013.01)

(58) Field of Classification Search
  CPC .... F04D 29/626; F04D 13/021; F04D 13/022; F04D 13/023; F04D 29/20; B60H 1/00; B60H 1/00471; F05D 2260/36; F05D 2300/43; F05D 2300/44
  See application file for complete search history.

(56) References Cited

U.S. PATENT DOCUMENTS

| | | | | |
|---|---|---|---|---|
| 3,307,634 A | * | 3/1967 | Bihlmire | B63H 1/20 384/215 |
| 4,943,209 A | * | 7/1990 | Beehler | F04D 29/263 416/204 R |
| 5,399,070 A | | 3/1995 | Alizaden | |
| 6,890,159 B2 | * | 5/2005 | Motomura | F04D 29/263 415/229 |

FOREIGN PATENT DOCUMENTS

| | | | |
|---|---|---|---|
| JP | 1-76595 U | | 5/1989 |
| JP | 11-343997 A | | 12/1999 |
| JP | 2004-225545 A | | 8/2004 |
| JP | 2005054722 A | * | 3/2005 |
| JP | 2011-163244 A | | 8/2011 |

OTHER PUBLICATIONS

International Search Report for corresponding International Application No. PCT/JP2015/002982 dated Sep. 8, 2015.

* cited by examiner

FAN ATTACHMENT STRUCTURE

CROSS-REFERENCE TO RELATED APPLICATION

This is a continuation of International Application No. PCT/JP2015/002982 filed on Jun. 15, 2015, which claims priority to Japanese Patent Application No. 2014-137426 filed on Jul. 3, 2014. The entire disclosures of these applications are hereby incorporated by reference.

BACKGROUND

The present disclosure relates to a fan attachment structure provided for a blower unit of a vehicle air conditioner, for example.

Vehicle air conditioners are generally provided with a blower unit for supplying air-conditioning air to a heat exchanger (see, for example, Japanese Unexamined Patent Publication No. 11-343997). Such a blower unit includes a centrifugal fan, a fan housing to house the fan, and a motor to drive the fan. The motor has a metallic output shaft, which has a D-cross section by having its peripheral surface partially cut off. The fan is a resin molded product, and includes, at the center of rotation thereof, a cylindrical insert member to which the output shaft of the motor is fitted. The insert member is made of a resin material having higher mechanical strength than the resin material that forms the body of the fan.

A motor output shaft with a D-cross section such as the one disclosed in Japanese Unexamined Patent Publication No. 11-343997 certainly functions as an anti-slip in the rotational direction, but is difficult to balance its rotation by itself, which is not beneficial. In addition, the hardness of the metallic output shaft requires a non-negligible cost for partially cutting off the output shaft into a desired D-cross section.

To avoid these disadvantages, the motor may have a round bar output shaft with a circular cross section so as to have its rotation balanced easily and to be formed at a reduced machining cost. A round bar output shaft, however, is no longer engageable with the insert member in its rotational direction when fitted into the insert member, and will slip more easily in the rotational direction with respect to the insert member when rotating, thus possibly allowing relative rotations. The output shaft may be prevented from slipping if the entire fan is molded of a resin material with high mechanical strength with the insert member omitted, for example. However, this method results in an increased material cost and/or molding cost for the fan.

Another possibility may be more tightly fitting the output shaft into the insert member either by increasing the outer diameter of the output shaft or by decreasing the inner diameter of the insert member in which the output shaft is fitted. In that case, however, the insert member in which the output shaft has been fitted comes to have its diameter increased so much as to bring the outer peripheral surface of the insert member into a highly tight contact with the inner peripheral surface of the center cylindrical portion of the fan body, thus binding the insert body and the fan body together too tightly.

In such a situation, the vibrations of the motor in rotation will be propagated more easily to the fan body through the output shaft and the insert member, thus possibly vibrating the fan body so much as to produce a harsh noise.

In view of the foregoing background, it is therefore an object of the present disclosure to reduce the vibrations propagated to the fan body and minimize a harsh noise in such a situation where a round bar motor output shaft is fitted into a cylindrical anti-slip member with higher mechanical strength than the fan body.

SUMMARY

To achieve this object, according to the present disclosure, recesses are formed on the outer peripheral surface of the anti-slip member to be inserted into the central cylindrical portion of the fan body, thereby reducing the contact force to be produced between the anti-slip member and the inner peripheral surface of the central cylindrical portion of the fan body.

A first aspect of the present disclosure provides a fan attachment structure for attaching a fan to an output shaft of a fan drive motor. The fan includes: a fan body made of a resin and including impellers and a central cylindrical portion provided at a center of rotation thereof; and a cylindrical anti-slip member configured to be secured to the fan body by being inserted into the central cylindrical portion and to rotate integrally with the fan body. The anti-slip member has been molded out of a resin having higher mechanical strength than the resin that makes the fan body.

The output shaft is configured as a round bar and fitted into the anti-slip member so as to rotate integrally with the anti-slip member.

An outer peripheral surface of a portion of the anti-slip member inserted into the central cylindrical portion has a recess.

According to this configuration, when the motor is started up with its output shaft fitted into the anti-slip member that has been inserted into the central cylindrical portion of the fan body, the rotational force of the output shaft is transmitted to the fan body via the anti-slip member, thus rotating the fan body. In this case, the recess formed on the outer peripheral surface of the anti-slip member reduces the contact force between the outer peripheral surface of the anti-slip member and the inner peripheral surface of the central cylindrical portion of the fan body, even when the output shaft is fitted thereto. This reduces the vibrations propagated from the motor to the fan body via the output shaft and the anti-slip member.

A second aspect of the disclosure is an embodiment of the first aspect. In the second aspect, the inner peripheral surface of the central cylindrical portion of the fan body has a fan's flat surface and a fan's circular arc surface, the outer peripheral surface of the portion of the anti-slip member inserted into the central cylindrical portion has a shaft's flat surface extending along the fan's flat surface and a shaft's circular arc surface extending along the fan's circular arc surface, and the recess is formed on the shaft's circular arc surface.

According to this configuration, the fan's flat surface and the shaft's flat surface significantly reduce the relative rotations between the anti-slip member and the fan body after the anti-slip member has been inserted into the central cylindrical portion of the fan body.

A third aspect of the disclosure is an embodiment of the first aspect. In the third aspect, the recess extends along a centerline of the anti-slip member.

According to this configuration, the contact force produced by the outer peripheral surface of the anti-slip member with respect to the inner peripheral surface of the central cylindrical portion of the fan body may be reduced in a broad range along the centerline of the anti-slip member.

According to the first aspect of the present disclosure, the output shaft of the motor is fitted into the anti-slip member to be inserted into the central cylindrical portion of the fan body. Also, the recess is formed on the outer peripheral surface of the anti-slip member to reduce the contact force produced by the anti-slip member with respect to the inner peripheral surface of the central cylindrical portion of the fan body. This reduces the vibrations propagated from the motor to the fan body via the output shaft and the anti-slip member sufficiently to significantly reduce a harsh noise.

According to the second aspect of the present disclosure, the inner peripheral surface of the central cylindrical portion of the fan body has a fan's flat surface and a fan's circular arc surface, and the outer peripheral surface of the anti-slip member has a shaft's flat surface extending along the fan's flat surface and a shaft's circular arc surface extending along the fan's circular arc surface. This significantly reduces the relative rotations between the anti-slip member and the fan body.

According to the third aspect of the present disclosure, the recess of the anti-slip member extends along the centerline of the anti-slip member. Thus, the contact force produced by the outer peripheral surface of the anti-slip member with respect to the inner peripheral surface of the central cylindrical portion of the fan body may be reduced in a broad range along the centerline of the anti-slip member. This further reduces the vibrations propagated to the fan body.

DETAILED DESCRIPTION

Embodiments of the present disclosure will now be described in detail with reference to the accompanying drawings. Note that the following description of embodiments is only an example in nature and is not intended to limit the scope, application, or uses of the present disclosure.

Figure 1:
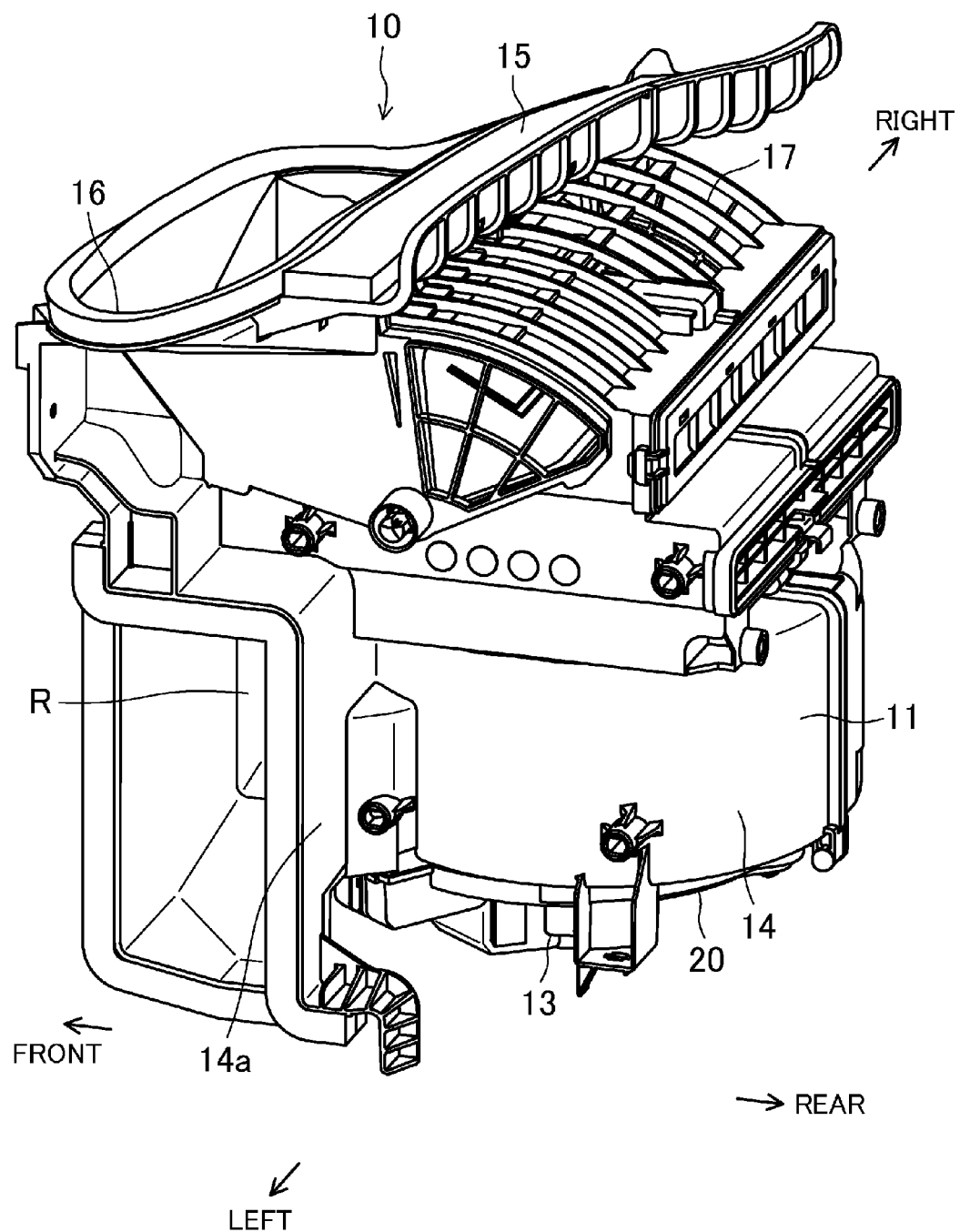
FIG. 1 is a perspective view of a blower unit according to an embodiment of the present disclosure.

FIG. 1 illustrates a blower unit 10 to which a fan attachment structure according to an embodiment of the present disclosure is applied. This blower unit 10 forms part of a vehicle air conditioner (not shown) installed in an automobile, for example. The vehicle air conditioner includes an air-conditioning unit (not shown) with a cooling heat exchanger and a heating heat exchanger, as well as the blower unit 10. The blower unit 10 is configured to supply air-conditioning air to the air-conditioning unit. The air-conditioning unit is configured to adjust the temperature of the air-conditioning air supplied from the blower unit 10 and then supply the air to respective parts of the vehicle cabin. The blower unit 10 and the air-conditioning unit are installed inside an instrument panel (not shown) arranged at a frontend of the vehicle cabin.

In the following description of embodiments, the present disclosure will be described as being applied to a so-called "semi-center unit" in which the air-conditioning unit of the vehicle air conditioner is arranged around a center in the vehicle width direction and the blower unit 10 is arranged on the passenger seat side. However, the present disclosure is applicable to not only such a "semi-center unit" but also a "full-center unit" in which the heat exchangers and the blower fan are aggregated around the center in the vehicle width direction. Substantially the same fan attachment structure is applicable to these semi-center and full-center units. Also, in this exemplary embodiment, the blower unit 10 is designed for a left-hand drive vehicle, of which the passenger seat is provided on the right side thereof, and therefore, is arranged on the right side of the vehicle.

In the following description of embodiments, the front side of the vehicle will be hereinafter simply referred to as "front," the rear side thereof "rear," the left side thereof "left," and the right side thereof "right."

The blower unit 10 includes a blower casing 11, a blower fan 12 housed in the blower casing 11, and a fan drive motor 13 to drive the blower fan 12. The blower casing 11 is comprised of a plurality of resin parts separable in the horizontal direction. Under the blower casing 11, provided is a fan housing 14 in which the blower fan 12 is housed. Inside the fan housing 14, an air outflow passage R is defined to surround the blower fan 12.

Over the blower casing 10, provided is a fresh/recirculation air switching portion 15. A fresh air inlet 16 is open at the frontend of the fresh/recirculation air switching portion 15. Although not shown, the fresh air inlet 16 communicates with the exterior of the vehicle cabin through a fresh-air-introducing duct. A recirculation air inlet 17 is open at the rear end of the fresh/recirculation air switching portion 15, and communicates with the interior of the vehicle cabin. Although not shown, a fresh/recirculation air switching damper is provided inside the fresh/recirculation air switching portion 15. The fresh/recirculation air switching damper allows the user to open one of the fresh and recirculation air inlets 16 and 17 and close the other.

The fan housing 14 has a cylindrical shape as a whole. A duct portion 14a is provided for a left wall portion at the frontend of the fan housing 14. The duct portion 14a forms a downstream end portion of the air outflow passage R and is connected to the air-conditioning unit.

Figure 2:
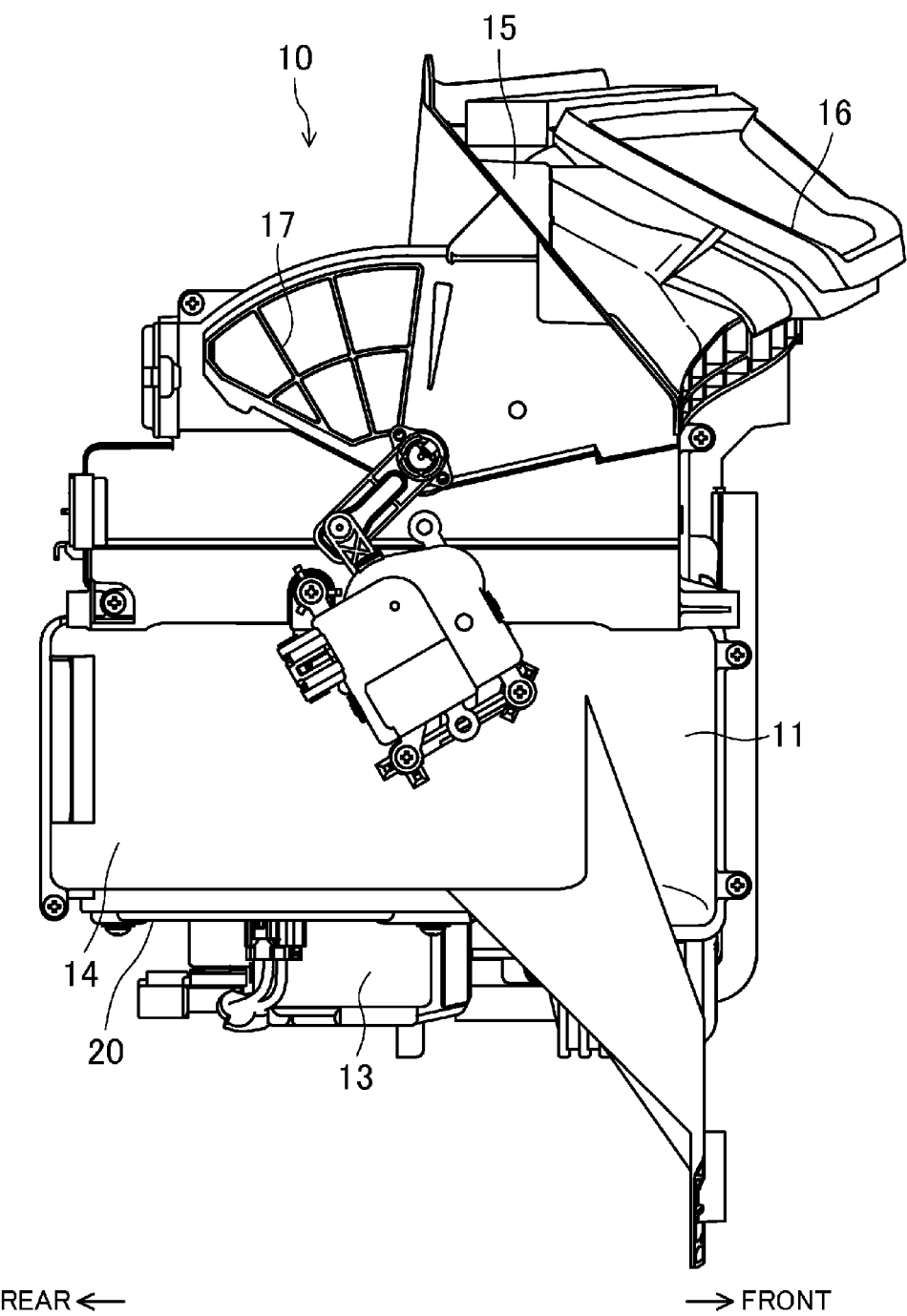
FIG. 2 is a right side view of the blower unit.

The bottom wall portion of the fan housing 14 has an insertion hole (not shown) through which the blower fan 12 is inserted into the fan housing 14 while being mounted to this blower unit 10. This insertion hole is closed with a circular plate 20, which is attachable to, and removable from, the bottom wall portion of the fan housing 14. The circular plate 20 is provided with a fan drive motor 13, which may have a conventional known structure. As shown in FIG. 2, the body portion of the fan drive motor 13 is provided so as to protrude both upward and downward with respect to the circular plate 20.

Figure 3:
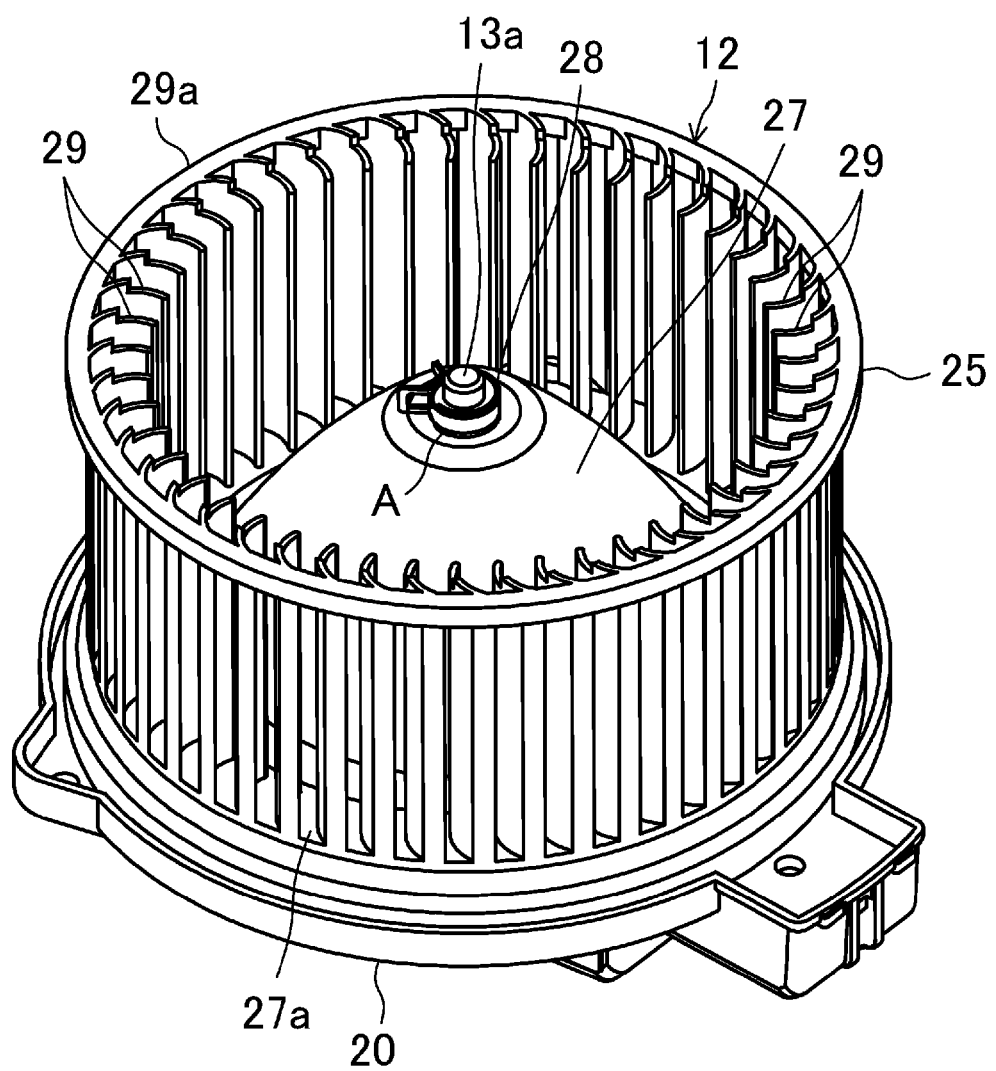
FIG. 3 is a perspective view of a fan mounted on the output shaft of a motor as viewed from above the fan.
Figure 4:
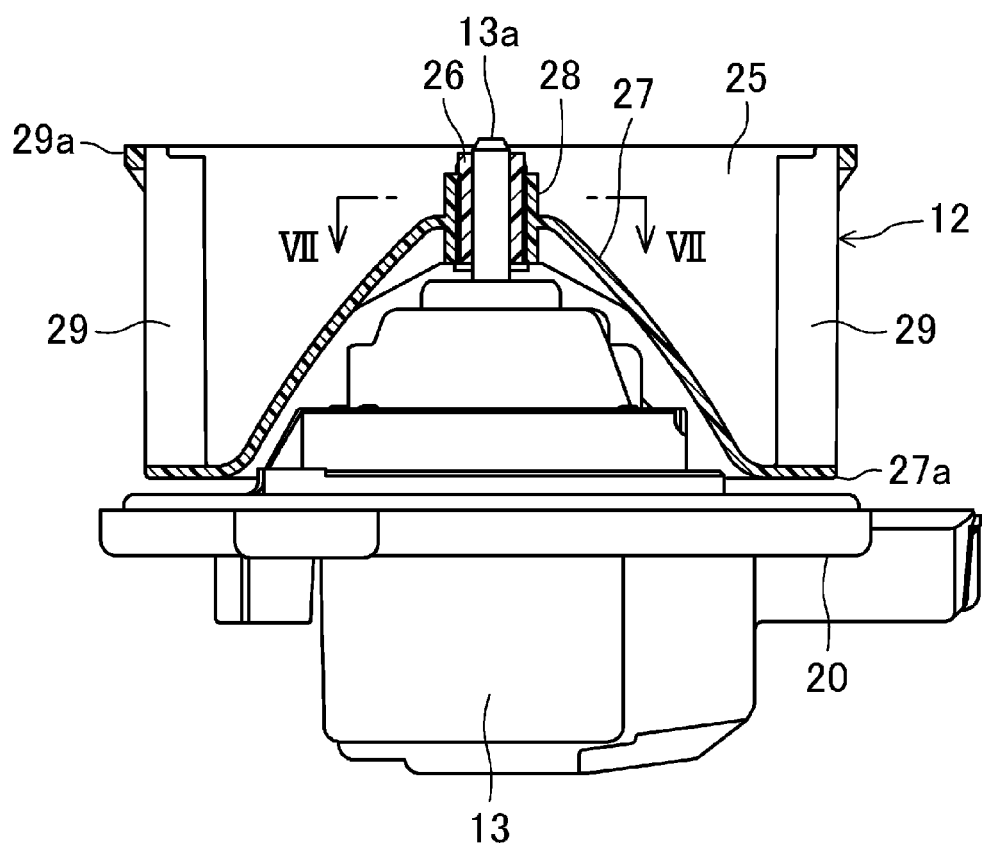
FIG. 4 is a cross-sectional view of the fan mounted on the output shaft of the motor.

As shown in FIGS. 3 and 4, the output shaft 13a of the fan drive motor 13 protrudes upward from the body of the fan drive motor 13. This output shaft 13a is arranged approximately at the center inside the fan housing 14. The output shaft 13a is implemented as a metallic round bar and has a generally circular cross section throughout the portion thereof that protrudes upward from the body of the fan drive motor 13.

As shown in FIG. 3, the blower fan 12 is a centrifugal fan (sirocco fan), and is configured to blow out the air sucked from over the blower fan 12 into the air outflow passage R of the fan housing 14 through the periphery of the blower fan 12. As shown in FIG. 4, the blower fan 12 includes a fan body 25 and an anti-slip member 26. The fan body 25 may be an injection molded product of a resin material such as polypropylene, and includes a conic portion 27, a central cylindrical portion 28 provided at the center of the conic portion 27 (i.e., the center of rotation), and a large number of impellers 29, 29, . . . . The conic portion 27, central cylindrical portion 28, and impellers 29 have been molded integrally.

The conic portion 27 of the fan body 25 has a curved shape overall such that a portion thereof around the center of rotation of the fan body 25 is located at the top and that the other portion thereof slopes radially downward and outward from the center of rotation toward the outer peripheral edge thereof. The radially outer peripheral portion of the conic portion 27 is located in the vicinity of the upper surface of the circular plate 20, and extends radially to define an annular extended portion 27a that runs continuously in the circumferential direction.

Figure 5:
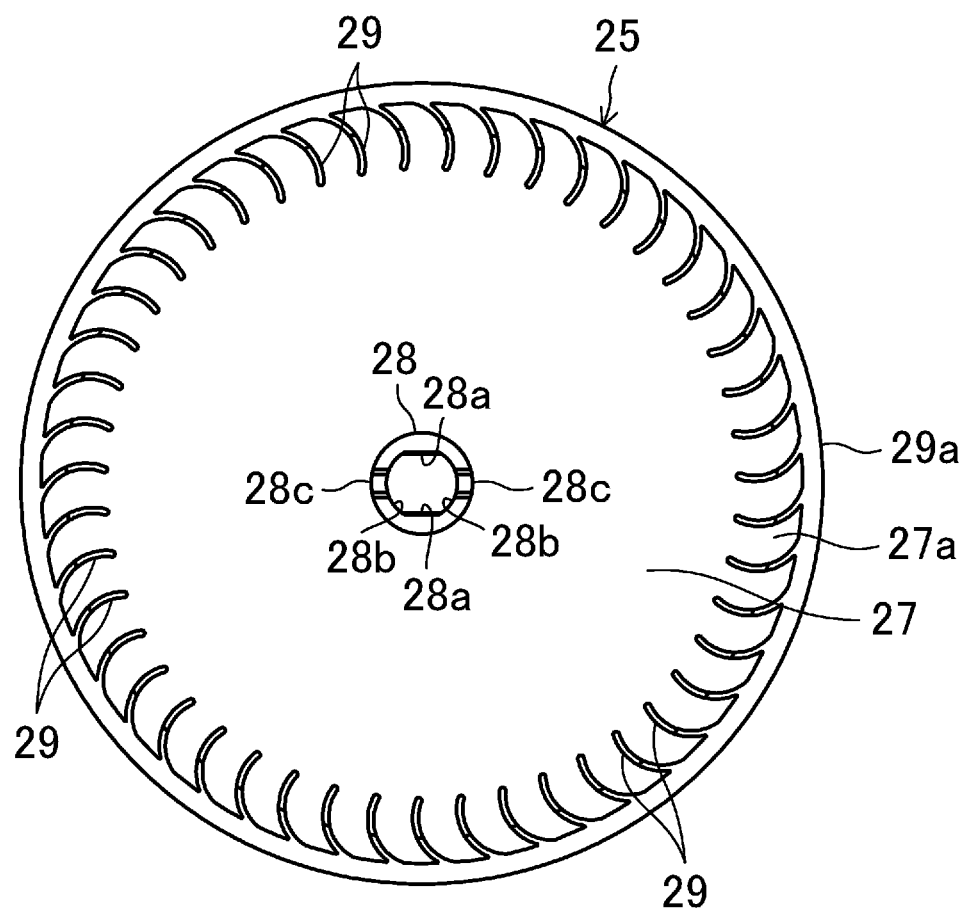
FIG. 5 is a plan view of its fan body.
Figure 6:
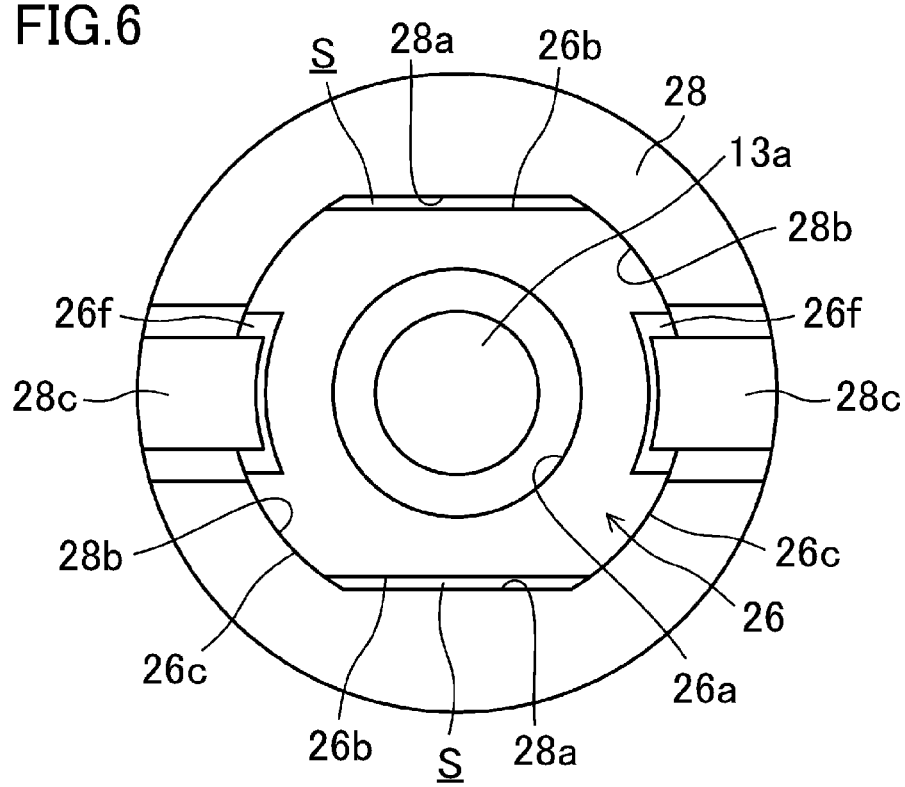
FIG. 6 is a plan view illustrating, on a larger scale, a center of rotation portion of the fan.
Figure 7:
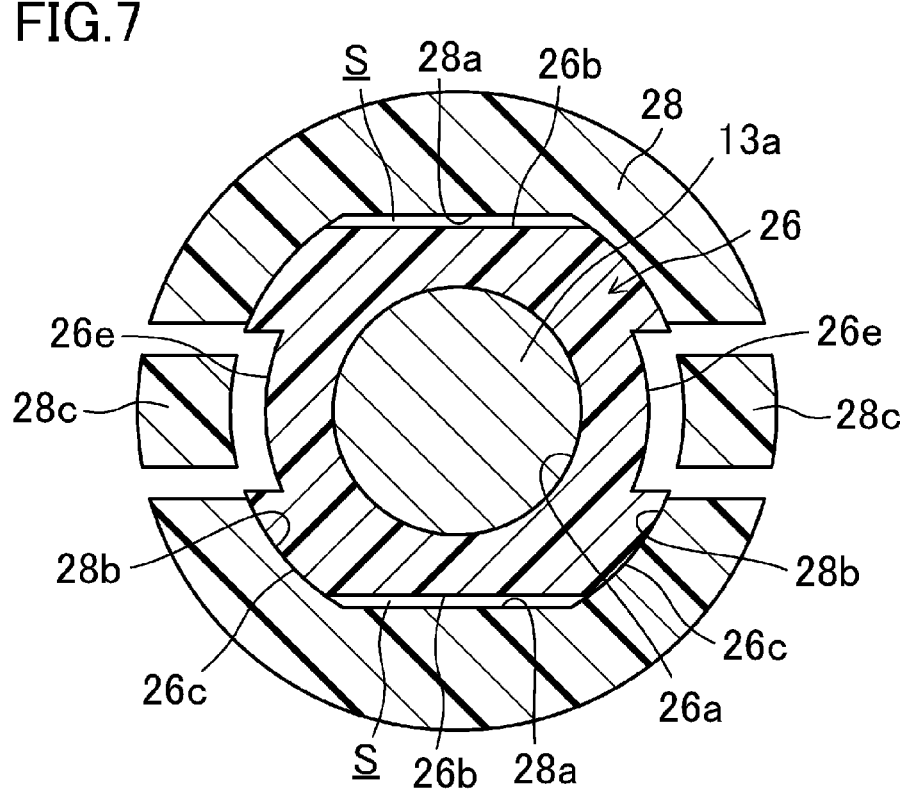
FIG. 7 is a cross-sectional view taken along the plane VII-VII shown in FIG. 4.

The central cylindrical portion 28 of the fan body 25 extends vertically upward and downward, and has openings at the top and bottom thereof. As shown in FIGS. 5-7, the inner peripheral surface of the central cylindrical portion 28 has two fan's flat surfaces 28a, 28a and two fan's circular arc surfaces 28b, 28b, which are arranged alternately along the circumference of the central cylindrical portion 28. The fan's flat surfaces 28a, 28a extend along the centerline of the central cylindrical portion 28 and are arranged so as to radially face each other. The radial distance from one fan's flat surface 28a to the centerline of the central cylindrical portion 28 is equal to the radial distance from the other fan's flat surface 28a to the centerline of the central cylindrical portion 28. The fan's circular arc surfaces 28b, 28b have a circular arc shape, of which the center agrees with the centerline of the central cylindrical portion 28, and are arranged so as to face each other.

In addition, at the top of the central cylindrical portion 28 of the fan body 25, provided are two flexible pieces 28c, 28c, which are located at the fan's circular arc surfaces 28b, 28b of the central cylindrical portion 28. The flexible pieces 28c are made of a flexible resin material and are flexibly deformable overall such that their upper end portion is radially displaceable with respect to the central cylindrical portion 28. Also, as shown in FIG. 3, a clamping fitting A to clamp the central cylindrical portion 28 is provided over the central cylindrical portion 28.

As shown in FIGS. 3 and 4, the impellers 29 have been molded to form integral parts of the upper surface of the annular extended portion 27a and to extend upward from the upper surface. Between each pair of impellers 29, a gap is left to allow the air to flow therethrough. At the top of the impellers 29, provided is an annular coupling portion 29a extending in the circumferential direction. The top of every impeller 29, 29, . . . is connected to the coupling portion 29a.

Figure 8:
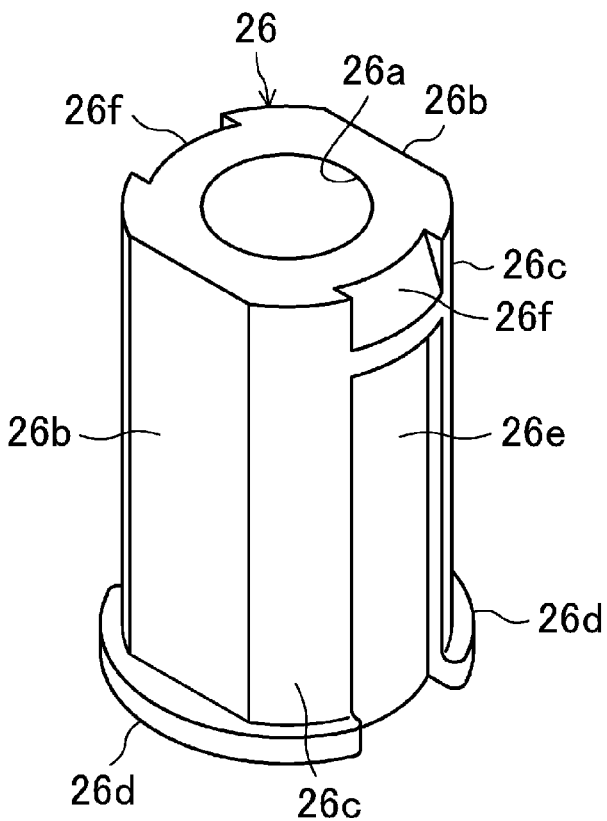
FIG. 8 is a perspective view of an anti-slip member as viewed from above it.
Figure 9:
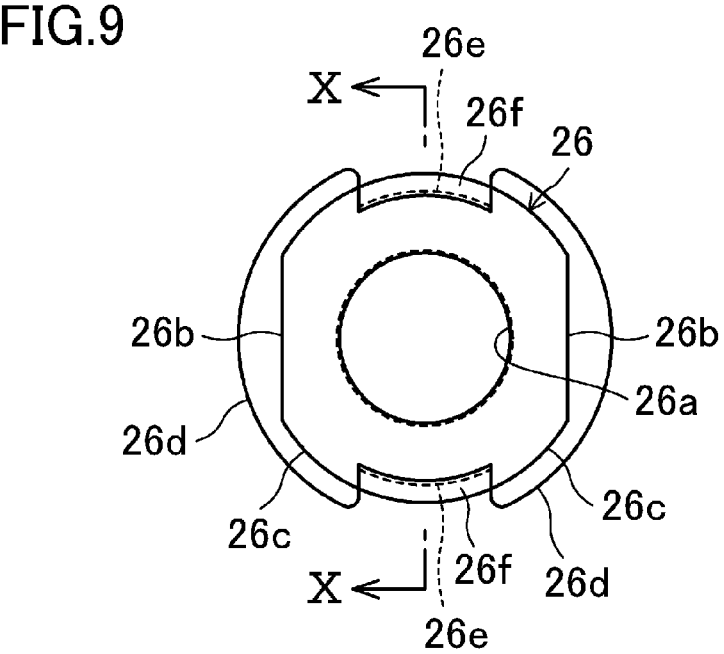
FIG. 9 is a plan view of the anti-slip member.
Figure 10:
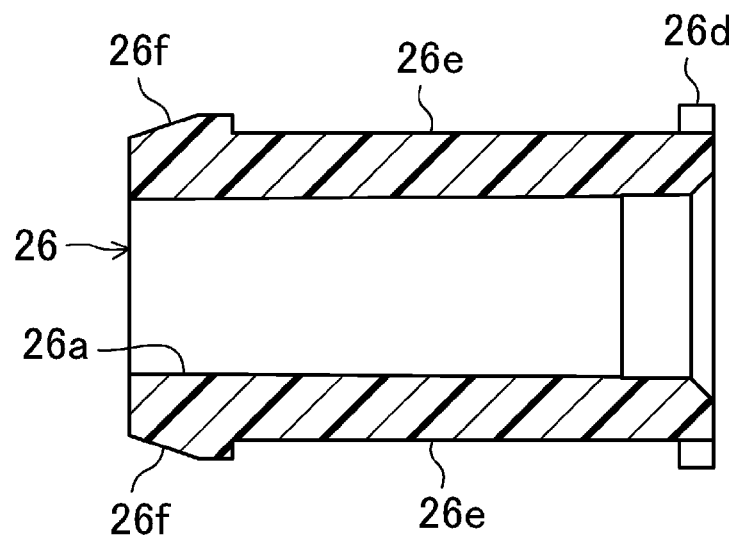
FIG. 10 is a cross-sectional view taken along the plane X-X shown in FIG. 9.
Figure 11:
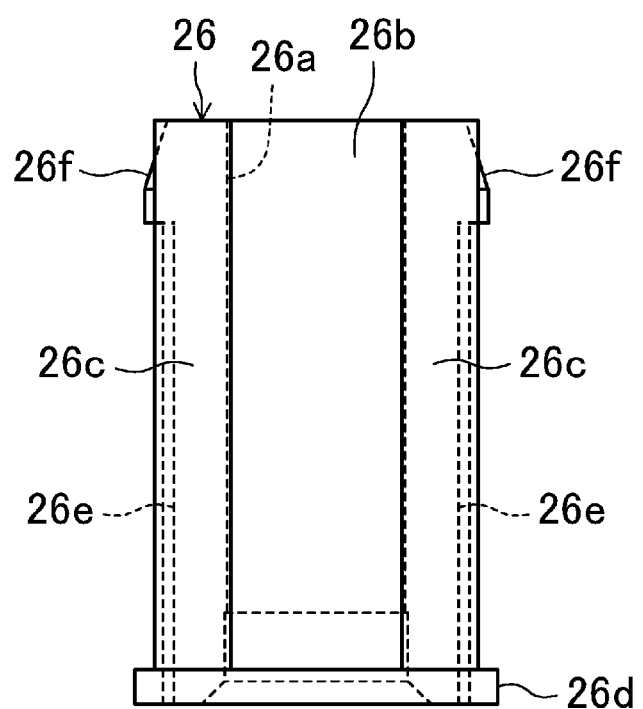
FIG. 11 is a side view of the anti-slip member as viewed from beside one of the flat surfaces thereof.
Figure 12:
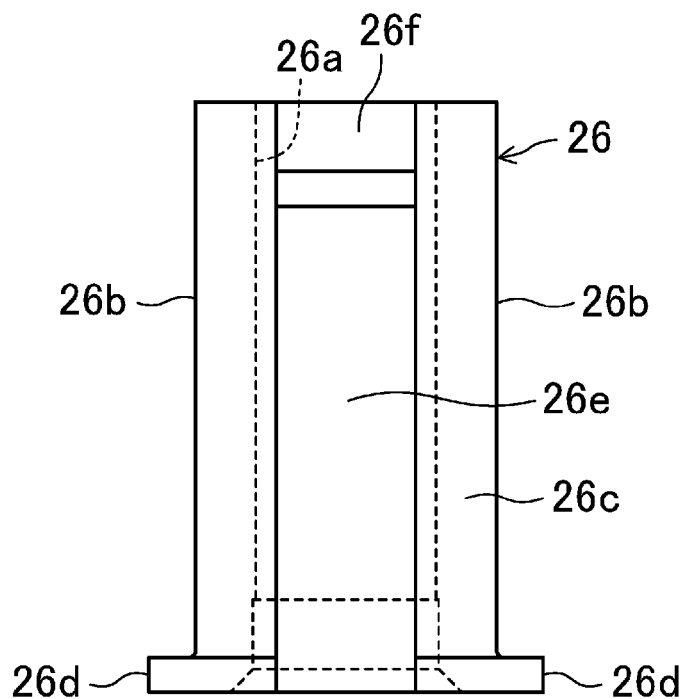
FIG. 12 is a side view of the anti-slip member as viewed from beside one of the recesses thereof.
Figure 13:
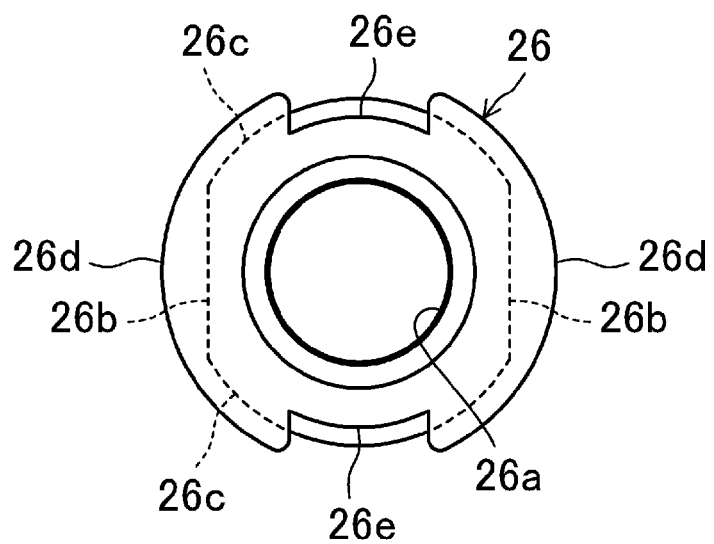
FIG. 13 is bottom view of the anti-slip member.

The anti-slip member 26 is formed by molding a resin material having higher mechanical strength (such as tensile strength or flexural strength) than the resin material of the fan body 25 into a cylindrical shape. The anti-slip member 26 is secured to the fan body 25 so as to be inserted into the central cylindrical portion 28 of the fan body 25. As shown in FIGS. 8-10, the center of the anti-slip member 26 is a shaft hole 26a to which the output shaft 13a of the motor 13 is fitted. The inner diameter of the shaft hole 26a is set to be a little smaller than the outer diameter of the output shaft 13a of the motor 13. Specifically, the output shaft 13a of the motor 13 is fitted into the shaft hole 26a of the anti-slip member 26 with such contact force as to prevent the output shaft 13a from slipping in the rotational direction with respect to the anti-slip member 26 when the motor 13 is started up with the output shaft 13a fitted into the shaft hole 26a. This fitting slightly increases the outer diameter of the anti-slip member 26. In this exemplary embodiment, the anti-slip member 26 is made of a resin material with high mechanical strength, and therefore, the output shaft 13a fitted into the shaft hole 26a of the anti-slip member 26 may be prevented for a long period of time from slipping in the rotational direction. In addition, not the entire blower fan 12 but only the anti-slip member 26 is molded out of a resin material with high mechanical strength. This may cut down the material cost of the blower fan 12.

The outer peripheral surface of a portion of the anti-slip member 26 to be inserted into the central cylindrical portion 28 have two shaft's flat surfaces 26b, 26b and two shaft's circular arc surfaces 26c, 26c, which are arranged alternately in the circumferential direction. The shaft's flat surfaces 26b, 26b extend along the centerline of the anti-slip member 26. The anti-slip member 26 is inserted into the central cylindrical portion 28 of the fan body 25 such that the shaft's flat surfaces 26b, 26b respectively face their associated fan's flat surfaces 28a, 28a and that the shaft's circular arc surfaces 26c, 26c respectively contact with their associated fan's circular arc surfaces 28b, 28b. Providing the shaft's flat surfaces 26b, 26b for the anti-slip member 26 may prevent the anti-slip member 26 from rotating relative to the central cylindrical portion 28 of the fan body 25.

As shown in FIGS. 6 and 7, the shaft's flat surfaces 26b, 26b are arranged to be out of contact with their associated fan's flat surfaces 28a, 28a such that a gap S is left between each pair of shaft's and fan's flat surfaces 26b, 28a that face each other. The magnitude of the gap S between each pair of shaft's and fan's flat surfaces 26b, 28a is determined in advance so as not to go zero even when the anti-slip member 26 has its diameter increased by fitting the output shaft 13a of the motor 13 into the shaft hole 26a of the anti-slip member 26.

Also, flanges 26d, 26d are provided at the respective bottoms of the shaft's circular arc surfaces 26c, 26c of the anti-slip member 26. Each of these flanges 26d is provided to protrude radially outward from the range where its associated shaft's circular arc surface 26c is located. These flanges 26d are designed to abut with the bottom of the central cylindrical portion 28 of the fan body 25 when the anti-slip member 26 is inserted into the central cylindrical portion 28. This prevents the anti-slip member 26 from being accidentally drawn out upward from the central cylindrical portion 28.

As shown in FIGS. 7 and 8, a recess 26e is formed on each shaft's circular arc surface 26c of the anti-slip member 26.

In a side view, each recess 26e has the shape of a rectangle extending upward from the bottom of its associated shaft's circular arc surface 26c.

The top of each recess 26e is located under, and away from, the top of its associated shaft's circular arc surface 26c. Also, each recess 26e is located at the middle of its associated shaft's circular arc surface 26c in the circumferential direction. When the anti-slip member 26 is inserted into the central cylindrical portion 28 of the fan body 25, the portions with the recesses 26e are out of contact with the fan's circular arc surfaces 28b, 28b of the central cylindrical portion 28.

In addition, as shown in FIG. 10, each shaft's circular arc surface 26c of the anti-slip member 26 also has a sloped surface 26f which is located over its associated recess 26e. The sloped surface 26f is sloped such that the closer to the top, the closer to the centerline of the anti-slip member 26. When the anti-slip member 26 is inserted into the central cylindrical portion 28 of the fan body 25, the flexible pieces 28c, 28c abut with the sloped surfaces 26f, 26f According to this exemplary embodiment, the inner peripheral surface of the central cylindrical portion 28 of the fan body 25 has fan's flat surfaces 28a, 28a and fan's circular arc surfaces 28b, 28b, and the outer peripheral surface of the anti-slip member 26 has shaft's flat surfaces 26b, 26b extending along the fan's flat surfaces 28a, 28a and shaft's circular arc surfaces 26c, 26c extending along the fan's circular arc surfaces 28b, 28b. This significantly reduces the relative rotations between the anti-slip member 26 and the fan body 25.

In addition, when the motor 13 is started up with its output shaft 13a fitted into the anti-slip member 26 that has been inserted into the central cylindrical portion 28 of the fan body 25, the rotational force of the output shaft 13a is transmitted to the fan body 25 via the anti-slip member 26, thus rotating the fan body 25. In this case, the recesses 26e, 26e formed on the outer peripheral surface of the anti-slip member 26 reduce the contact force between the outer peripheral surface of the anti-slip member 26 and the inner peripheral surface of the central cylindrical portion 28 of the fan body 25, even when the output shaft 13a is fitted thereto. This reduces the vibrations propagated from the motor 13 to the fan body 25 via the output shaft 13a and the anti-slip member 26, thus resulting in a significantly reduced harsh noise.

Furthermore, the recesses 26e, 26e of the anti-slip member 26 extend along the centerline of the anti-slip member 26. Thus, the contact force produced by the outer peripheral surface of the anti-slip member 26 with respect to the inner peripheral surface of the central cylindrical portion 28 of the fan body 25 may be reduced in a broad range along the centerline of the anti-slip member 26. This further reduces the vibrations propagated to the fan body 25.

Moreover, the gap S left between each shaft's flat surface 26b of the anti-slip member 26 and its associated fan's flat surface 28a of the fan body 25 reduces the contact force produced by the outer peripheral surface of the anti-slip member 26 with respect to the inner peripheral surface of the central cylindrical portion 28 of the fan body 25, even after the output shaft 13a has been fitted. This reduces the vibrations propagated from the motor 13 to the fan body 25 via the output shaft 13a and the anti-slip member 26, thus resulting in a significantly reduced harsh noise.

In the exemplary embodiment described above, the gap S is supposed to be left between each shaft's flat surface 26b of the anti-slip member 26 and its associated fan's flat surface 28a of the fan body 25. However, this is only a non-limiting exemplary embodiment. Optionally, the gap S may be eliminated, for example. In that case, each shaft's flat surface 26b of the anti-slip member 26 contacts with its associated fan's flat surface 28a of the fan body 25. However, the recesses 26e, 26e on the outer peripheral surface of the anti-slip member 26 may also reduce the contact force produced by the outer peripheral surface of the anti-slip member 26 with respect to the inner peripheral surface of the central cylindrical portion 28 of the fan body 25, even after the output shaft 13a has been fitted.

Figure 14:
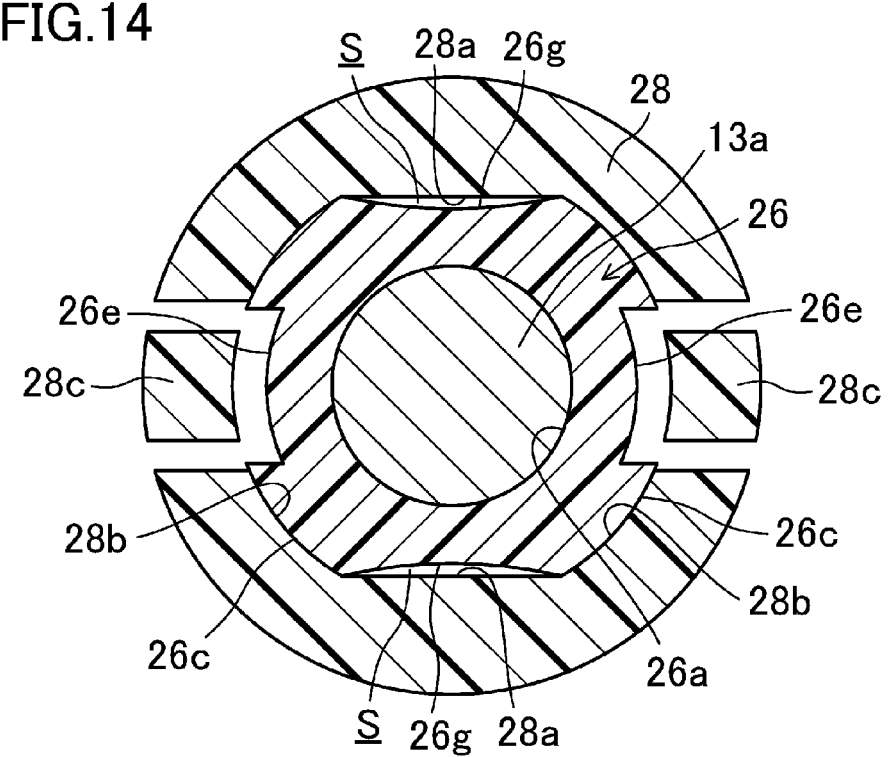
FIG. 14 illustrates a first variation of the embodiment and corresponds to FIG. 7.

In the embodiment described above, the anti-slip member 26 has the shaft's flat surfaces 26b. However, this is only an example of the present disclosure. Alternatively, as in a first variation shown in FIG. 14, the anti-slip member 26 may also have a pair of shaft's curved surfaces 26g. Each of these shaft's curved surfaces 26g is curved away from its associated fan's flat surface 28a of the fan body 25 (i.e., toward the output shaft 13a), thus leaving a gap S between the shaft's curved surface 26b and the fan's flat surface 28a. Likewise, although not shown, each fan's flat surface 28a may be replaced with a curved surface which is curved away from the output shaft 13a.

Figure 15:
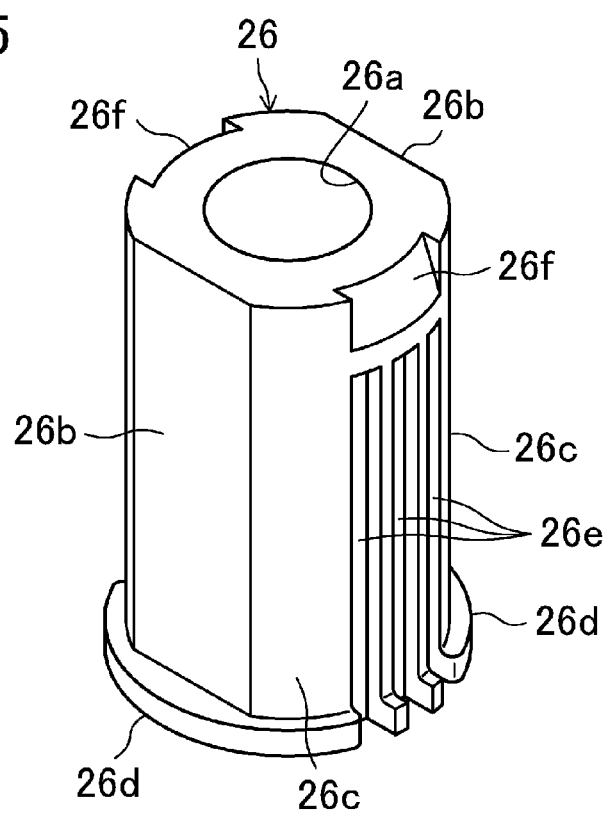
FIG. 15 illustrates a second variation of the embodiment and corresponds to FIG. 8.

Still alternatively, as in a second variation shown in FIG. 15, each shaft's circular arc surface 26c of the anti-slip member 26 may have a plurality of recesses 26e. Furthermore, the recess 26e does not have to have a vertically elongated shape but may also have any other arbitrary shape.

Note that each embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a fan attachment structure according to the present disclosure is applicable to a blower unit for a vehicle air conditioner, for example.

What is claimed is:

1. A fan attachment structure for attaching a fan to an output shaft of a fan drive motor, wherein
    the fan includes: a fan body made of a resin and including impellers and a central cylindrical portion provided at a center of rotation thereof; and a cylindrical anti-slip member configured to be secured to the fan body by being inserted into the central cylindrical portion and to rotate integrally with the fan body, the anti-slip member having been molded out of a resin having higher mechanical strength than the resin that makes the fan body,
    an inner peripheral surface of the central cylindrical portion of the fan body has a first flat surface,
    the output shaft is configured as a round bar and fitted into the anti-slip member so as to rotate integrally with the anti-slip member,
    an outer peripheral surface of a portion of the anti-slip member inserted into the central cylindrical portion has a recess, and a second flat surface extending along a direction of the first flat surface, and
    a gap is between the first flat surface and the second flat surface.

2. The fan attachment structure of claim 1, wherein the inner peripheral surface of the central cylindrical portion of the fan body has a first circular arc surface,
    the outer peripheral surface of the portion of the anti-slip member inserted into the central cylindrical portion has a second circular arc surface extending along the first circular arc surface, and
    the recess is formed on the second circular arc surface.

3. The fan attachment structure of claim 1, wherein
    the recess extends along a centerline of the anti-slip member.

* * * * *